Reissued Mar. 6, 1934 Re. 19,099

UNITED STATES PATENT OFFICE 19,099

TISSUE FILLER

Erling H. Haabestad, Springfield, Pa., assignor to Hydrol Chemical Company, Inc., Philadelphia, Pa., a corporation of Pennsylvania No Drawing. Original No. 1,889,655, dated November 29, 1932, Serial No. 532,710, April 24, 1931. Application for reissue November 29, 1933, Serial No. 700,375

15 Claims. (Cl. 27—21)

The present invention relates to an improved solidifying chemical solution for use as a tissue filler in connection with the treatment of corpses.

It is well known that bodies of human beings after death, in many instances, are emaciated. Even before beath the person may be emaciated, and in such instances after death the emaciation is very much more pronounced. This condition varies, it depending largely upon the sickness from which death results.

It is the aim of undertakers in embalming a body and laying it out to have it present as natural appearance as possible and to accomplish this result it is necessary to cause the tissues to stand out firmly and in such a way as to present the least possible distortion of features.

It is the purpose of the present invention to provide a solidifying solution which when injected by any suitable device such as a hypodermic syringe, will solidify upon contact with the tissue fluids in the body and the head, particularly the face, and cause the tissues to stand out firmly.

Such a solution may be made from a cellulosic material dissolved in a highly water soluble solvent as, for example, nitro-cellulose dissolved in methanol, ethyl acetate, or ethylene glycol monomethyl ether. Cellulose acetate dissolved in acetone is also of a character which will solidify on contact with water, as are various solutions of gum, etc.

This solidifying solution when injected hypodermically into human corpses will, when coming in contact with the water in the body, solidify and produce firm tissues. In treating a body it is well known that after extracting the blood the water in the body will settle to the back and it is the aim to inject the solution before the water really drains to the back of the body. If it is found that the water has drained to the back before the solution is injected, the body may be turned over face down and left in this position to allow the water to settle toward the front. Then it is turned back, and at the proper time the solution is injected, before the water has had time to drain again to the back of the body. The solution is used more in the head than in other parts of the body, as it is to build up the head tissues and make them stand out firmly, and care is exercised to render the facial expressions and features as nearly natural as possible.

It is to be understood that the particulars herein given are in no way limitative, and that while still keeping within the scope of the invention, any desired modification of details and proportions may be made in the solution according to circumstances.

In using this solution in human corpses it is obvious that water may be injected into the flesh tissues either before, or simultaneously with the injection of the solution, or subsequently thereto in order to cause immediate or simultaneous solidification of the solution. In injecting water simultaneously with the solution it is possible to use a double hypodermic needle.

The invention having been set forth, what is claimed is:

1. A tissue filler for corpses comprising a solution of normally water insoluble cellulosic material in a highly water soluble solvent of the character of methanol, such solution being hypodermically injectible into tissues of an emaciated corpse to precipitate said cellulosic material by solution of said water soluble solvent in the tissue fluids and thereby build up said tissues.

2. A tissue filler for corpses comprising a solution of nitro-cellulose in methanol, such solution being hypodermically injectible into tissues of an emaciated corpse to precipitate said nitro-cellulose by solution of said methanol in the tissue fluids and thereby build up said tissues.

3. The method of building up tissues of an emaciated corpse which includes injecting subcutaneously a solution of normally water insoluble cellulosic material in a readily water soluble solvent and allowing the solution to contact with the tissues whereby the solvent disperses in the tissues to precipitate a readily moldable tissue filler.

4. The method of building up tissues of an emaciated corpse which includes injecting subcutaneously a solution of nitro-cellulose in methanol and allowing the solution to contact with the tissues whereby the methanol disperses in the tissues to precipitate the nitro-cellulose which constitutes a readily moldable tissue filler.

5. A tissue filler for corpses comprising a solution in a solvent which is soluble in natural tissue liquid of a material adapted, upon contact of the solution with natural tissue liquid, to be precipitated from solution in the form of a plastic mass.

6. A tissue filler for corpses comprising a solution in a solvent which is soluble in natural tissue liquid of a material chosen from the class consisting of gums and cellulose derivatives, said material being adapted, upon contact with natural tissue liquid, to be precipitated from solution in the form of a plastic mass.

7. A tissue filler for corpses comprising a solution in a solvent chosen from the class consisting of lower alcohols, ethyl acetate and ethylene glycol monomethyl ether, of a material adapted, upon contact of the solution with natural tissue liquid, to be precipitated from solution in the form of a plastic mass.

8. A tissue filler for corpses comprising a solution in a solvent chosen from the class consisting of lower alcohols, ethyl acetate and ethylene glycol monomethyl ether, of a solute chosen from the class consisting of gums and cellulose derivatives and adapted, upon contact of the solution with natural tissue fluid, to be precipitated from solution in the form of a plastic mass.

9. The method of building up tissues of an emaciated corpse which includes injecting subcutaneously a solution in a solvent which is soluble in natural tissue liquid of a material adapted, upon contact of the solution with natural tissue liquid, to be precipitated from solution in the form of a plastic mass.

10. The method of building up tissues of an emaciated corpse which includes injecting subcutaneously a solution in a solvent which is soluble in natural tissue liquid of a material chosen from the class consisting of gums and cellulose derivatives, said material being adapted, upon contact with natural tissue liquid, to be precipitated from solution in the form of a plastic mass.

11. The method of building up tissues of an emaciated corpse which includes injecting subcutaneously a solution in a solvent chosen from the class consisting of lower alcohols, ethyl acetate and ethylene glycol monomethyl ether, of a material adapted, upon contact of the solution with natural tissue liquid, to be precipitated from solution in the form of a plastic mass.

12. The method of building up tissues of an emaciated corpse which includes injecting subcutaneously a solution in a solvent chosen from the class consisting of lower alcohols, ethyl acetate and ethylene glycol monomethyl ether, of a solute chosen from the class consisting of gums and cellulose derivatives and adapted, upon contact of the solution with natural tissue fluid, to be precipitated from solution in the form of a plastic mass.

13. The method of building up tissues of an emaciated corpse which includes injecting subcutaneously water and a solution in a solvent which is soluble in water of a material adapted, upon contact of the solution with water, to be precipitated from solution in the form of a plastic mass.

14. The method of building up tissues of an emaciated corpse which includes injecting subcutaneously a liquid and a solution in a second liquid which second liquid is soluble in the first liquid, of a material adapted upon contact of the solution with the first liquid, to be precipitated from solution in the form of a plastic mass.

15. The method of building up tissues of an emaciated corpse which includes injecting subcutaneously a solution which is adapted upon contact thereof with natural tissue liquid to undergo a change involving the sub-cutaneous formation of a plastic mass.

ERLING H. HAABESTAD.